United States Patent
Shinohara et al.

(10) Patent No.: US 6,873,855 B1
(45) Date of Patent: Mar. 29, 2005

(54) RADIO TELEPHONE SYSTEM WITH BASE STATION CAPABLE OF UPDATING DATA OF MOBILE STATIONS AND CHANGING TRANSMISSION POWER LEVEL

(75) Inventors: Koji Shinohara, Tosu (JP); Koki Hamada, Kasuga (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 08/359,743

(22) Filed: Dec. 20, 1994

(30) Foreign Application Priority Data

Dec. 20, 1993 (JP) .............................................. 5-319510

(51) Int. Cl.$^7$ ................................................ H04B 7/00
(52) U.S. Cl. ...................................... 455/522; 455/69
(58) Field of Search ............................... 455/33.1, 33.2, 455/54.1, 54.2, 56.1, 69, 88, 68, 67.11, 522, 422.1, 456.1, 457, 458, 426.1, 517, 521, FOR 100; 379/59, 60

(56) References Cited

U.S. PATENT DOCUMENTS

| | | | | |
|---|---|---|---|---|
| 3,925,782 A | * | 12/1975 | Anderl et al. .................. | 455/69 |
| 5,153,902 A | * | 10/1992 | Buhl et al. ..................... | 379/60 |
| 5,257,283 A | * | 10/1993 | Gilhousen et al. .......... | 455/54.1 |
| 5,369,681 A | * | 11/1994 | Boudreau et al. ............. | 379/59 |
| 5,475,863 A | * | 12/1995 | Simpson et al. ............ | 455/458 |

FOREIGN PATENT DOCUMENTS

| | | | | |
|---|---|---|---|---|
| JP | 2215238 | 8/1990 | | |
| JP | 03-6929 | * 1/1991 | ........ | 455/FOR 100 |
| JP | 4200126 | 7/1992 | | |
| JP | 514459 | 1/1993 | | |

* cited by examiner

*Primary Examiner*—Nguyen T. Vo
(74) *Attorney, Agent, or Firm*—Rossi & Associates (57) ABSTRACT

A radio telephone system includes a base station and a plurality of mobile stations. The base station transmits echo-back request signals to the mobile stations in turn. When the mobile station fails to transmit an echo-back response signal, the base station determines that the non-responsive mobile station is outside a radio zone of the base station, and deletes the corresponding data from a storage section thereof. Further, the base station is capable of changing its transmission power level so as to change a size of the radio zone correspondingly. Specifically, the base station monitors a range of presence of the mobile stations within the radio zone, and changes its transmission power level depending on such a range. For example, when such a range spreads over the radio zone, the base station may control its transmission power level to be maximum. On the other hand, when such a range is only around the base station, the base station may control its transmission power level to be minimum.

18 Claims, 10 Drawing Sheets

RADIO TELEPHONE SYSTEM WITH BASE STATION CAPABLE OF UPDATING DATA OF MOBILE STATIONS AND CHANGING TRANSMISSION POWER LEVEL

BACKGROUND OF THE INVENTION

1. Field of the Invention

The present invention relates to a radio telephone system.

2. Description of the Prior Art

The recent development in mobile radio communication systems, particularly in radio telephone systems, has been remarkable. In the radio telephone system, a user's mobile station is connected by radio to a base station which is connected to the fixed telephone network. As a method of communication between the base station and the mobile station, the multi-zone system has been available, wherein the base stations are dispersed to allow each of them to use the same frequency band so as to increase the total number of the mobile stations to be accommodated.

In this multi-zone system, each of the base stations is set to have a relatively small radio zone so as to cover the service area by a number of the base stations. This can reduce output levels of the respective base and mobile stations, while capable of increasing the number of the mobile stations to be accommodated.

Hereinbelow, a conventional radio telephone system will be described.

Figure 9:
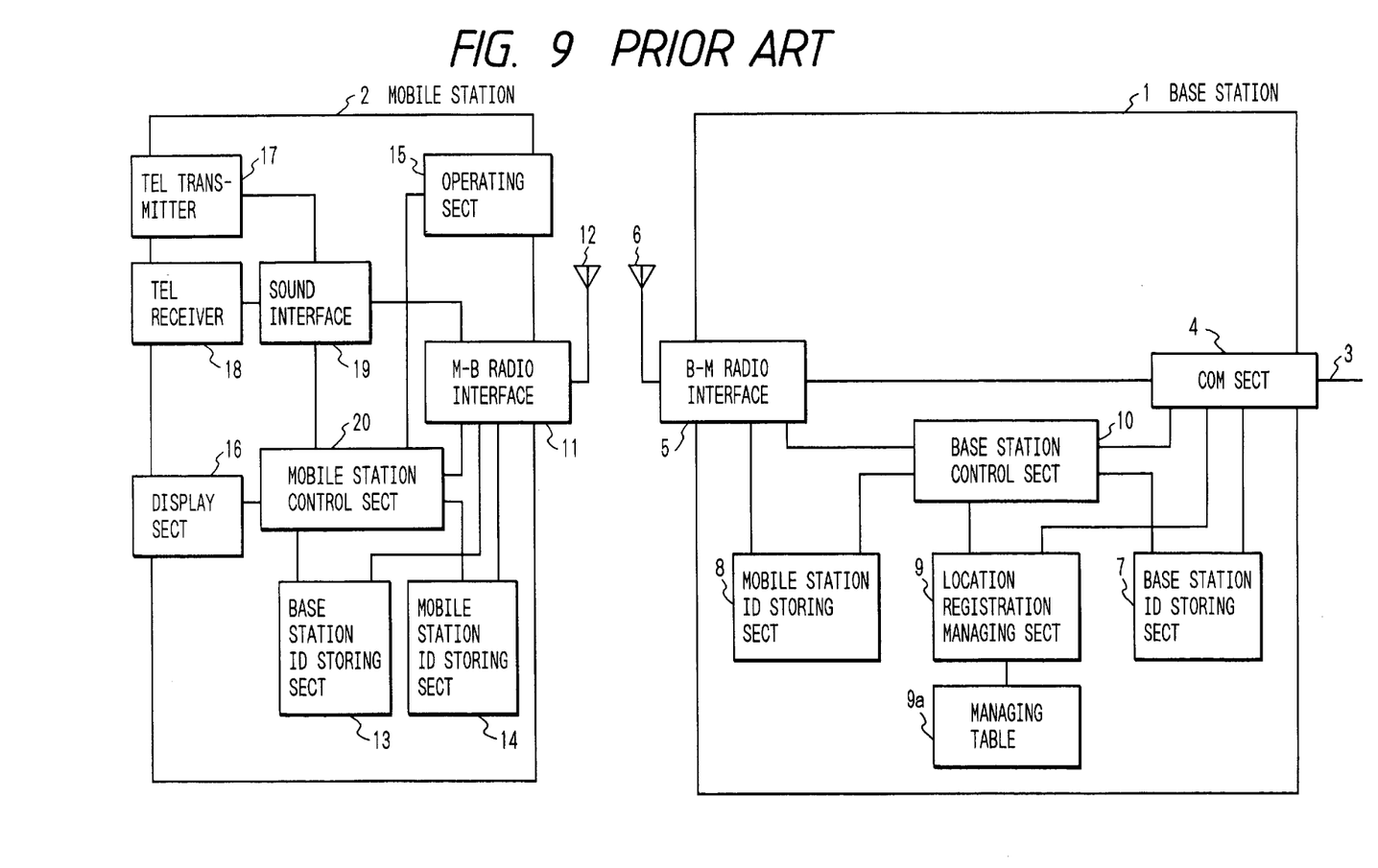
FIG. 9 is a block diagram showing a structure of a conventional radio telephone system.

FIG. 9 is a block diagram showing a structure of the conventional radio telephone system.

In FIG. 9, numeral 1 denotes a base station connected to a wire circuit 3 and numeral 2 denotes a mobile station which is connectable to the base station 1 by radio. The mobile station 2 performs signal transmission and reception relative to the wire circuit 3 via the base station 1.

In the base station 1, numeral 4 denotes a communication section for receiving sound and data signals sent through the wire circuit 3 and for sending sound and data signals into the wire circuit 3. Numeral 5 denotes a B-M radio interface in the form of transmitter-receiver for call and control channels for communication with the mobile station 2. Numeral 6 denotes a base station antenna connected to the B-M radio interface 5. Numeral 7 denotes a base station ID storing section where an identification code of the base station for identifying classification, such as, service and owner company, of the base station is stored. Hereinafter, this identification code will be also referred to as "base station ID". Numeral 8 denotes a mobile station ID storing section where an identification code/codes of the mobile station/stations 2 (hereinafter also referred to as "mobile station ID") present in a radio zone of the base station 1 is/are registered. Numeral 9 denotes a location registration managing section for managing registration of the mobile station ID of the mobile station 2 present in the radio zone of the base station 1. Numeral 9a denotes a managing table where data of the mobile station/stations 2 present in the radio zone of the base station 1 is/are registered. Numeral 10 denotes a base station control section for controlling communications performed by the base station 1 relative to the mobile station 2 and a circuit control office and other operations of the base station 1.

On the other hand, in the mobile station 2, numeral 11 denotes an M-B radio interface in the form of transmitter-receiver for call and control channels for communication with the base station 1. Numeral 12 denotes a mobile station antenna connected to the M-B radio interface 11 for transmission and reception of radiowaves with the base station antenna 6. Numeral 13 denotes a base station ID storing section where a base station ID of a base station 1 having a classification which is connectable to the present mobile station 2 is stored. Numeral 14 denotes a mobile station ID storing section where the mobile station ID of the present mobile station 2 is stored. Numeral 15 denotes an operating section for performing dial inputting and instruction inputting, such as, "on-hook" and "off-hook". Numeral 16 denotes a display section in the form of, such as, an LED (light-emitting diode) display or an LCD (liquid crystal display) for displaying information, such as, a dialed number and a date. Numeral 17 denotes a telephone transmitter and number 18 denotes a telephone receiver. Numeral 19 denotes a sound interface for receiving a sound signal from the M-B radio interface 11 for an output through the telephone receiver 18, for sending a sound signal from the telephone transmitter 17 to the M-B radio interface 11 and for performing signal gain adjustments in those instances. Numeral 20 denotes a mobile station control section for controlling operations of the mobile station 2.

Now, operations of the radio telephone system as structured above will be described hereinbelow.

First, the location registration of the mobile station 2 will be explained.

For specifying one of the radio zones of the base stations 1 where the mobile station 2 concerned is present, the location registration is performed to register the mobile station ID of the mobile station 2 in the base station 1.

The location registration is performed when a signal level received through the radio channel is lowered below a given value during communication and thus switching is necessary to another base station 1, or when an operation for the location registration is performed via the operating section 15 in the mobile station 2. On the other hand, there is another radio telephone system, wherein a location registration request is periodically transmitted from the mobile station 2 to cause the base station 1 to perform the location registration.

Figure 10:
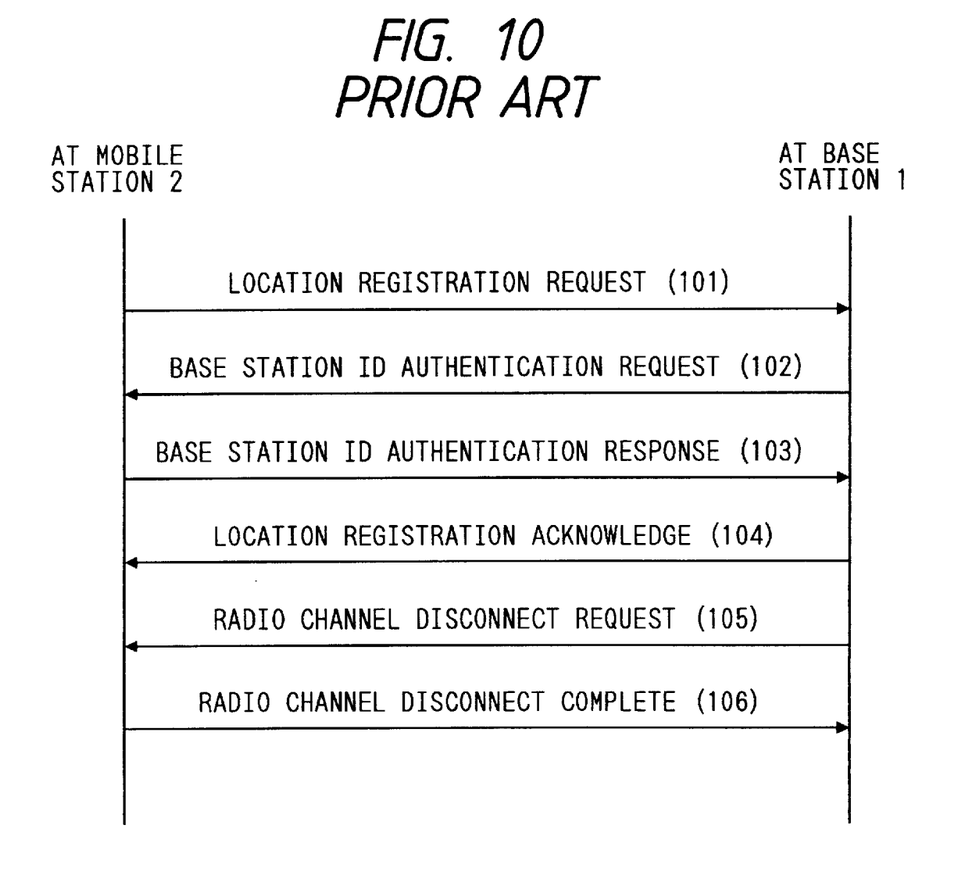
FIG. 10 is a conventional location registration sequence diagram.

Hereinbelow, the location registration sequence will be described with reference to FIG. 10 which shows a location registration sequence diagram.

When the location registration becomes necessary due to the foregoing situation, the mobile station control section 20 causes the M-B radio interface 11 to transmit an location registration request signal and a mobile station ID via the mobile station antenna 12 (step 101).

When these signals are received at the B-M radio interface 5 of the base station 1 via the base station antenna 6, the base station control section 10 causes the B-M radio interface 5 to send a base station ID authentication request signal for requesting the mobile station 2 to transmit a base station ID stored in the mobile station 2 (step 102).

When the M-B radio interface 11 of the mobile station 2 receives this base station ID authentication request signal, the mobile station control section 20 reads out the base station ID from the base station ID storing section 13 and causes the M-B radio interface 11 to send a base station ID authentication response signal including the read-out base station ID (step 103).

When the B-M radio interface 5 of the base station 1 receives this authentication response signal, the base station control section 10 checks the base station ID included in the received authentication response signal with a base station ID stored in the base station ID storing section 7. When both identification codes are matched with each other, the base station control section 10 causes the mobile station ID storing section 8 to store the mobile station ID transmitted in advance from the mobile station 2. Simultaneously, the base station control section 10 sends this mobile station ID to the location registration managing section 9.

The location registration managing section 9 registers data of the mobile station 2 in the managing table 9a, and controls the communication section 4 to send a signal indicative of completion of the location registration of the mobile station 2 to a managing center (not shown) which is connected to the wire circuit 3 and performs the overall management of the base stations. Subsequently, the base station control section 10 transmits to the mobile station 2 via the B-M radio interface 5 a signal representing that the foregoing location registration processes have been acknowledged (step 104). Thereafter, the base station control section 10 further transmits to the mobile station 2 via the B-M radio interface 5 a signal requesting the mobile station 2 to disconnect the radio channel now used (step 105).

In response to this disconnect request signal, the mobile station 2 sends a signal indicative of disconnection of the radio channel to the base station 1 so as to release the current radio channel (step 106).

The location registration of the mobile station 2 is completed by the foregoing operation sequence.

Now, explanation will be made to a case where a call is made from the mobile station 2.

The mobile station control section 20 transmits the base station ID stored in the base station ID storing section 13 and other given signals, such as, a sound signal, via the M-B radio interface 11.

When the B-M radio interface 5 of the base station 1 receives these signals, the base station control section 10 compares the received base station ID with the station ID stored in the base station ID storing section 7. When both identification codes are matched with each other, the base station control section 10 connects between the B-M radio interface 5 and the communication section 4 to allow communication between the wire circuit 3 and the mobile station 2.

Now, explanation will be made to a case where the mobile station 2 receives a call.

When the communication section 4 of the base station 1 receives from the wire circuit 3 a reception request signal including date of the mobile station 2 to be called, the location registration managing section 9 checks whether the data of the mobile station 2 included in the received signal are registered in the managing table 9a. If registered, the location registration managing section 9 notifies the base station control section 10 accordingly. In response to this, the base station control section 10 causes the B-M radio interface 5 to transmit the corresponding mobile station ID stored in the mobile station ID storing section 8 and a sound signal. When the M-B radio interface 11 of the mobile station 2 receives the transmitted signal, the mobile station control section 20 compares the received mobile station ID with the mobile station ID stored in the mobile station ID storing section 14. When both identification codes are matched with each other, the mobile station control section 20 transmits a connection request signal via the M-B radio interface 11. When this connection request signal is received by the B-M radio interface 5 of the base station 1, the base station control section 10 connects between the mobile station 2 and the wire circuit 3.

In the foregoing conventional radio telephone system, however, in case the location registration is performed based on the operation of the operating section 15 of the mobile station 2, the data and the mobile station ID of the mobile station 2 continue to remain in the managing table 9a and the mobile station ID storing section 8 of the basic station 1 until a location registration of the mobile station 2 is performed in another radio zone. Accordingly, even when the mobile station 2 goes away from the radio zone of the basic station 1 concerned, the data and the mobile station ID of the mobile station 2 still remain in that base station 1. This requires the base station 1 to make a transmission for call reception to the mobile station 2 which is now outside the radio zone concerned. This further requires unnecessarily increased storage capacities of the mobile station ID storing section 8 and the managing table 9a. Particularly, in the base station 1 having a radio zone where the coming-in and coming-out of the mobile stations 2 are frequent, a great amount of data which are actually not necessary remains stored.

Further, in the foregoing conventional radio telephone system, the base station 1 always transmits radiowaves in the maximum output power so as to make it possible to communicate with the mobile station 2 anywhere in the radio zone concerned. Accordingly, even when no mobile station 2 is present in the radio zone concerned or the mobile stations 2 are concentrated around the base station 1, the radiowaves are transmitted in the maximum power. This consumes the electric power more than necessary.

SUMMARY OF THE INVENTION

Therefore, it is an object of the present invention to provide an improved radio telephone system.

According to one aspect of the present invention, a radio telephone system including a base station connected to a wire circuit and a plurality of mobile stations which perform radio communications with the base station, respectively, comprises a base station echo-back transmit-receive section provided in the base station for transmitting echo-back request signals to the mobile stations, respectively, and for receiving echo-back response signals transmitted from the mobile stations; and a mobile station echo-back transmit-receive section provided in each of the mobile stations for transmitting the echo-back response signal in response to the echo-back request signal transmitted from the base station.

According to another aspect of the present invention, a radio telephone system including a base station connected to a wire circuit and a plurality of mobile stations which perform radio communications with the base station, respectively, comprises a mobile station echo-back transmit-receive section provided in each of the mobile stations for transmitting an echo-back response signal in response to an echo-back request signal transmitted from the base station; a managing table provided in the base station for storing date of the mobile stations: a base station echo-back transmit-receive section provided in the base station for transmitting the echo-back request signals to the mobile stations stored in the managing table and for receiving the echo-back response signals transmitted from the mobile stations; and a control section provided in the base station for deleting from the managing table the data of the mobile station to which the echo-back request signal was transmitted while no echo-back response signal was received therefrom.

According to another aspect of the present invention, a base station of a radio telephone system, connected to a wire circuit, comprises a first interface for performing radio communication with a mobile station; and a control section provided in the base station for controlling a transmission power of the first interface depending on a signal transmitted from the mobile station.

According to another aspect of the present invention, a radio telephone system including a base station connected to a wire circuit and a plurality of mobile stations which perform radio communications with the base station, respectively, comprises a first interface provided in each of the mobile stations for performing communication with the base station; a second interface provided in the base station, the second interface adapted to change its transmission power for performing radio communications with the mobile stations, respectively; and a control section provided in the base station for controlling the transmission power of the second interface depending on positions of the mobile stations.

According to another aspect of the present invention, a base station of a radio telephone system, connected to a wire circuit, comprises a first interface for performing radio communications with a plurality of mobile stations; a transmit-receive section for receiving signals from the mobile stations via the first interface; and a control section for controlling an output level of the first interface depending on an operation of the transmit-receive section.

According to another aspect of the present invention, a radio telephone system including a base station connected to a wire circuit and a plurality of mobile stations which perform radio communications with the base station, respectively, comprises a first interface provided in each of the mobile stations for performing communication with the base station; a second interface provided in the base station, the second interface being variable in its transmission power for performing radio communications with the mobile stations; a base station echo-back transmit-receive section provided in the base station for transmitting echo-back request signals to the mobile stations via the second interface and for receiving echo-back response signals transmitted from the mobile stations via the second interface; a mobile station echo-back transmit-receive section provided in each of the mobile stations for transmitting the echo-back response signal in response to the echo-back request the transmitted from the base station; and a control section for controlling a transmission power of the second interface depending on an operation of the base station echo-back transmit-receive section.

According to another aspect of the present invention, a radio telephone system including a base station connected to a wire circuit and a plurality of mobile stations which perform radio communications with the base station, respectively, comprises a first interface provided in each of the mobile stations for performing communication with the base station; a second interface provided in the base station for performing radio communications with the mobile stations; a base station echo-back transmit-receive section provided in the base station for transmitting echo-back request signals to the mobile stations via the second interface and for receiving echo-back response signals transmitted from the mobile stations via the second interface; a mobile station echo-back transmit-receive section provided in each of the mobile stations for transmitting the echo-back response signal in response to the echo-back request signal transmitted from the base station; a readable/writable storing section; a first control section for controlling an output level of the second interface to be maximum, for controlling the base station echo-back transmit-receive section to transmit the echo-back request signals to the mobile stations so as to count the number of the echo-back response signals in response to the echo-back request signals, and for writing the counted value in the storing section; a second control section for controlling an output level of the second interface to a given value and for controlling the base station echo-back transmit-receive section to transmit the echo-back request signals to the mobile stations so as to count the number of the echo-back response signals in response to the echo-back request signals; a comparing section for comparing the counted values stored in the second control section and the storing section; and a third control section for fixing the output level of the second interface to a given value when the counted values are equal to each other based on the comparison of the comparing section.

According to another aspect of the present invention, a radio telephone system including a base station connected to a wire circuit and a plurality of mobile stations which perform radio communications with the base station, respectively, comprises a first interface provided in the mobile station for performing communication with the base station; a second interface provided in the base station for performing radio communication with the mobile stations; a base station echo-back transmit-receive section provided in the base station for transmitting echo-back request signals to the mobile stations via the second interface and for receiving echo-back response signals transmitted from the mobile stations via the second interface; a mobile station echo-back transmit-receive section provided in each of the mobile stations for transmitting the echo-back response signal in response to the echo-back request signal transmitted from the base station; a readable/writable storing section; a first control section for controlling an output level of the second interface to be maximum, for controlling the base station echo-back transmit-receive section to transmit the echo-back request signals to the mobile stations so as to count the number of the echo-back response signals in response to the echo-back request signals, and for writing the counted value in the storing section: a second control section for controlling an output level of the second interface to a given value and for controlling the base station echo-back transmit-receive section to transmit the echo-back request signals to the mobile stations so as to count the number of the echo-back response signals in response to the echo-back request signals; a comparing section for comparing the counted values stored in the second control section and the storing section; a third control section for fixing the output level of the second interface to a given value when the counted values are equal to each other based on the comparison of the comparing section; and a fourth control section for activating the second control section when the counted values are different from each other based on the comparison of the comparing section.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENT

Now, preferred embodiments of the present invention will be described with reference to the accompanying drawings.

Figure 1:
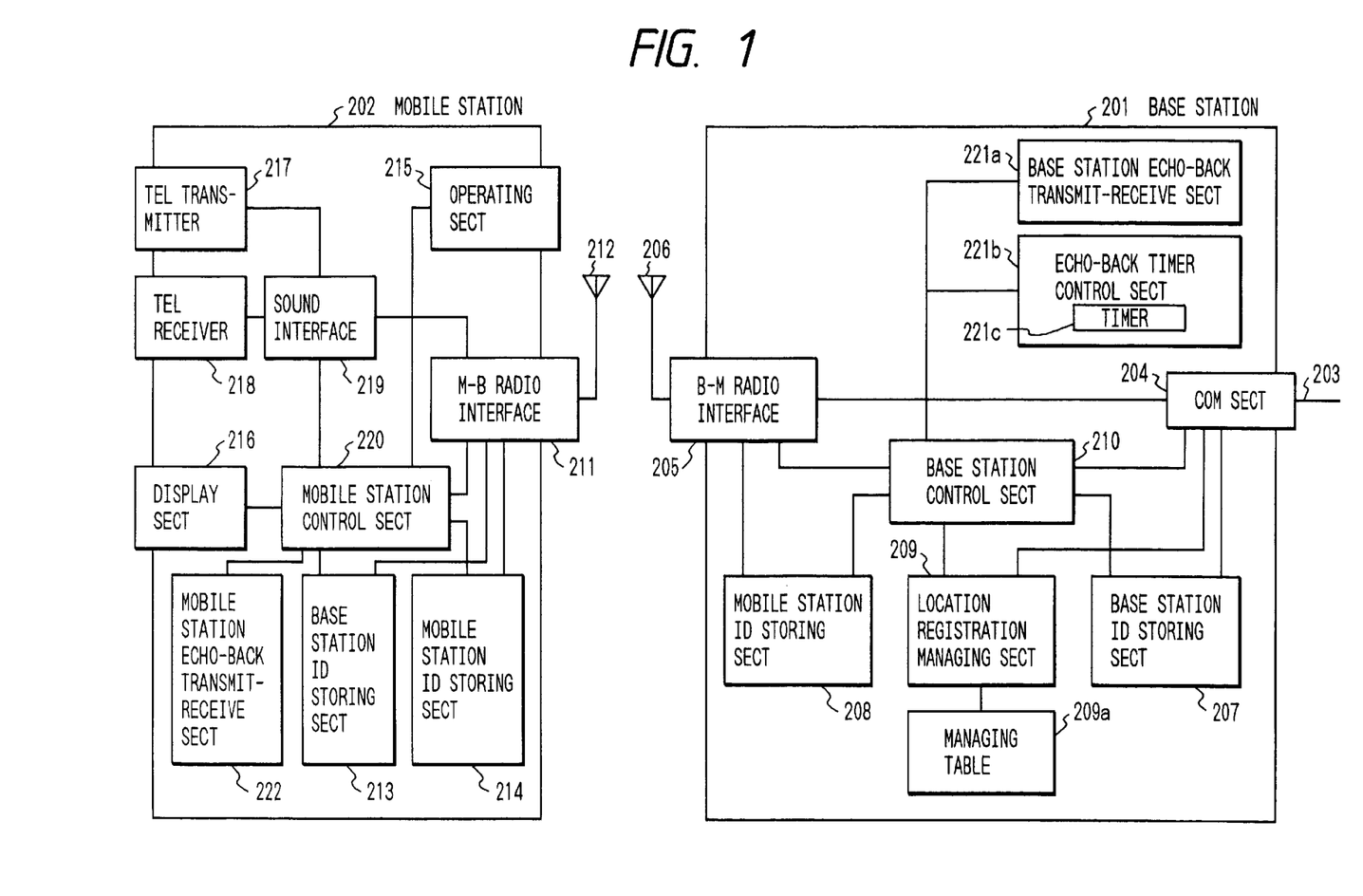
FIG. 1 is a block diagram showing a structure of a radio telephone system according to a first preferred embodiment of the present invention.

FIG. 1 is a block diagram showing a structure of a radio telephone system according to a first preferred embodiment of the present invention.

In FIG. 1, numeral 201 denotes a base station connected to a wire circuit 203 and numeral 202 denotes a mobile station which is connectable to the base station 201 by radio. The mobile station 202 performs signal transmission and reception relative to the wire circuit 203 via the base station 201.

In the base station 201, numeral 204 denotes a communication section for receiving sound and data signals sent through the wire circuit 203 and for sending sound and data signals into the wire circuit 203. Numeral 205 denotes a B-M radio interface in the form of transmitter-receiver for call and control channels for communication with the mobile station 202. The B-M radio interface 205 has a plurality of radio channels and is capable of communicating with a plurality of the mobile stations 202. Numeral 206 denotes a base station antenna connected to the B-M radio interface 205. Numeral 207 denotes a base station ID storing section where an identification code of the base station for identifying classification, such as, service and owner company, of the base station is stored. Hereinafter, this identification code will be also referred to as "base station ID". Numeral 208 denotes a mobile station ID storing section where an identification code/codes of the mobile station/stations 202 (hereinafter also referred to as "mobile station ID") present in a radio zone of the base station 201 is/are registered. Numeral 209 denotes a location registration managing section for managing registration of the mobile station ID of the mobile station 202 present in the radio zone of the base station 201. Numeral 209a denotes a managing table where data of the mobile station/stations 202 present in the radio zone of the base station 201 are registered. Numeral 210 denotes a base station control section for controlling communications performed by the base station 201 relative to the mobile station 202 and a circuit control office and other operations of the base station 201. Numeral 221a denotes a base station echo-back transmit-receive section for controlling the B-M radio interface 205 to transmit echo-back request signals and for receiving echo-back response signals from the mobile stations 202 via the B-M radio interface 205. Numeral 221b denotes an echo-back timer control section for regulating an interval for transmitting the echo-back request signals from the base station 201 to the mobile stations 202. The echo-back timer control section 221b includes a timer which is counted up after lapse of a predetermined time from the start-up thereof.

On the other hand, in the mobile station 202, numeral 211 denotes an M-B radio interface in the form of transmitter-receiver for call and control channels for communication with the base station 201. Numeral 212 denotes a mobile station antenna connected to the M-B radio interface 211 for transmission and reception of radiowaves with the base station antenna 206. Numeral 213 denotes a base station ID storing section where a base station ID of a base station 201 having a classification which is connectable to the present mobile station 202 is stored. Numeral 214 denotes a mobile station ID storing section where the mobile station ID of the present mobile station 202 is stored. Numeral 215 denotes an operating section for performing dial inputting and instruction inputting, such as, "on-hook" and "off-hook". Numeral 216 denotes a display section in the form of, such as, an LED (light-emitting diode) display or an LCD (liquid crystal display) for displaying information, such as, a dialed number and a date. Numeral 217 denotes a telephone transmitter and number 218 denotes a telephone receiver. Numeral 219 denotes a sound interface for receiving a sound signal from the M-B radio interface 211 for an output through the telephone receiver 218, for sending a sound signal from the telephone transmitter 217 to the M-B radio interface 211 and for performing signal gain adjustments in those instances. Numeral 220 denotes a mobile station control section for controlling operations of the mobile station 202. Numeral 222 denotes a mobile station echo-back transmit-receive section for transmitting an echo-back response signal via the M-B radio interface 211 when the echo-back request signal is received at the M-B radio interface 211.

Now, operations of the radio telephone system as structured above will be described hereinbelow.

First, the location registration of the mobile station 202 will be explained.

Figure 2:
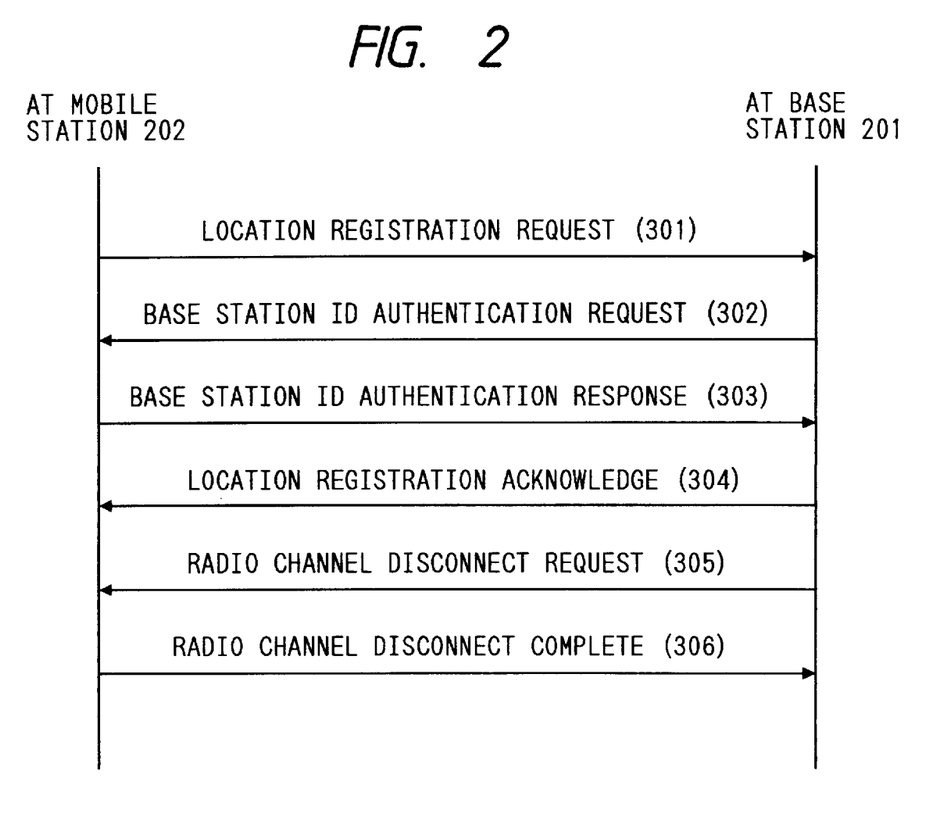
FIG. 2 is a location registration sequence diagram according to the first preferred embodiment.

Hereinbelow, the location registration sequence will be described with reference to FIG. 2 which shows a location registration sequence diagram.

When the location registration becomes necessary due to the foregoing situation, the mobile station control section 220 causes the M-B radio interface 211 to transmit an location registration request signal and a mobile station ID via the mobile station antenna 212 (step 301).

When these signals are received at the B-M radio interface 205 of the base station 201 via the base station antenna 206, the base station control section 210 causes the B-M radio interface 205 to send a base station ID authentication request signal for requesting the mobile station 202 to transmit a base station ID stored in the mobile station 220 (step 302).

When the M-B radio interface 211 of the mobile station 202 receives this base station ID authentication request signal, the mobile station control section 220 reads out the base station ID from the base station ID storing section 213 and causes the M-B radio interface 211 to send a base station ID authentication response signal including the read-out base station ID (step 303).

When the B-M radio interface 205 of the base station 201 receives this authentication response signal, the base station control section 210 checks the base station ID included in the received authentication response signal with a base station ID stored in the base station ID storing section 207. When both identification codes are matched with each other, the base station control section 210 causes the mobile station ID storing section 208 to store the mobile station ID transmitted in advance from the mobile station 202. Simultaneously, the base station control section 210 sends this mobile station ID to the location registration managing section 209.

The location registration managing section 209 registers data of the mobile station 202 in the managing table 209a, and controls the communication section 204 to send a signal indicative of completion of the location registration of the mobile station 202 to a managing center (not shown) which is connected to the wire circuit 203 and performs the overall management of the base stations. Subsequently, the base station control section 210 transmits to the mobile station 202 via the B-M radio interface 205 a signal representing that the foregoing location registration processes have been acknowledged (step 304). Thereafter, the base station control section 210 further transmits to the mobile station 202 via the B-M radio interface 205 a signal requesting the mobile station 202 to disconnect the radio channel now used (step 305).

In response to this disconnect request signal, the mobile station 202 sends a signal indicative of disconnection of the radio channel to the base station 201 so as to release the current radio channel (step 306).

The location registration of the mobile station 202 is completed by the foregoing operation sequence.

Now, explanation will be made to a case where a call is made from the mobile station 202.

The mobile station control section 220 transmits the base station ID stored in the base station ID storing section 213 and other given signals, such as, a sound signal, via the M-B radio interface 211.

When the B-M radio interface 205 of the base station 201 receives these signals, the base station control section 210 compares the received base station ID with the station ID stored in the base station ID storing section 207. When both identification codes are matched with each other, the base station control section 210 connects between the B-M radio interface 205 and the communication section 204 to allow communication between the wire circuit 203 and the mobile station 202.

Now, explanation will be made to a case where the mobile station 202 receives a call.

When the communication section 204 of the base station 201 receives from the wire circuit 203 a reception request signal including date of the mobile station 202 to be called, the location registration managing section 209 checks whether the data of the mobile station 202 included in the received signal are registered in the managing table 209*a*. If registered, the location registration managing section 209 notifies the base station control section 210 accordingly. In response to this, the base station control section 210 causes the B-M radio interface 205 to transmit the corresponding mobile station ID stored in the mobile station ID storing section 208 and a sound signal. When the M-B radio interface 211 of the mobile station 202 receives the transmitted signal, the mobile station control section 220 compares the received mobile station ID with the mobile station ID stored in the mobile station ID storing section 214. When both identification codes are matched with each other, the mobile station control section 220 transmits a connection request signal via the M-B radio interface 211. When this connection request signal is received by the B-M radio interface 205 of the base station 201, the base station control section 10 connects between the mobile station 202 and the wire circuit 203.

Now, the echo-back routine will be described hereinbelow.

Figure 3:
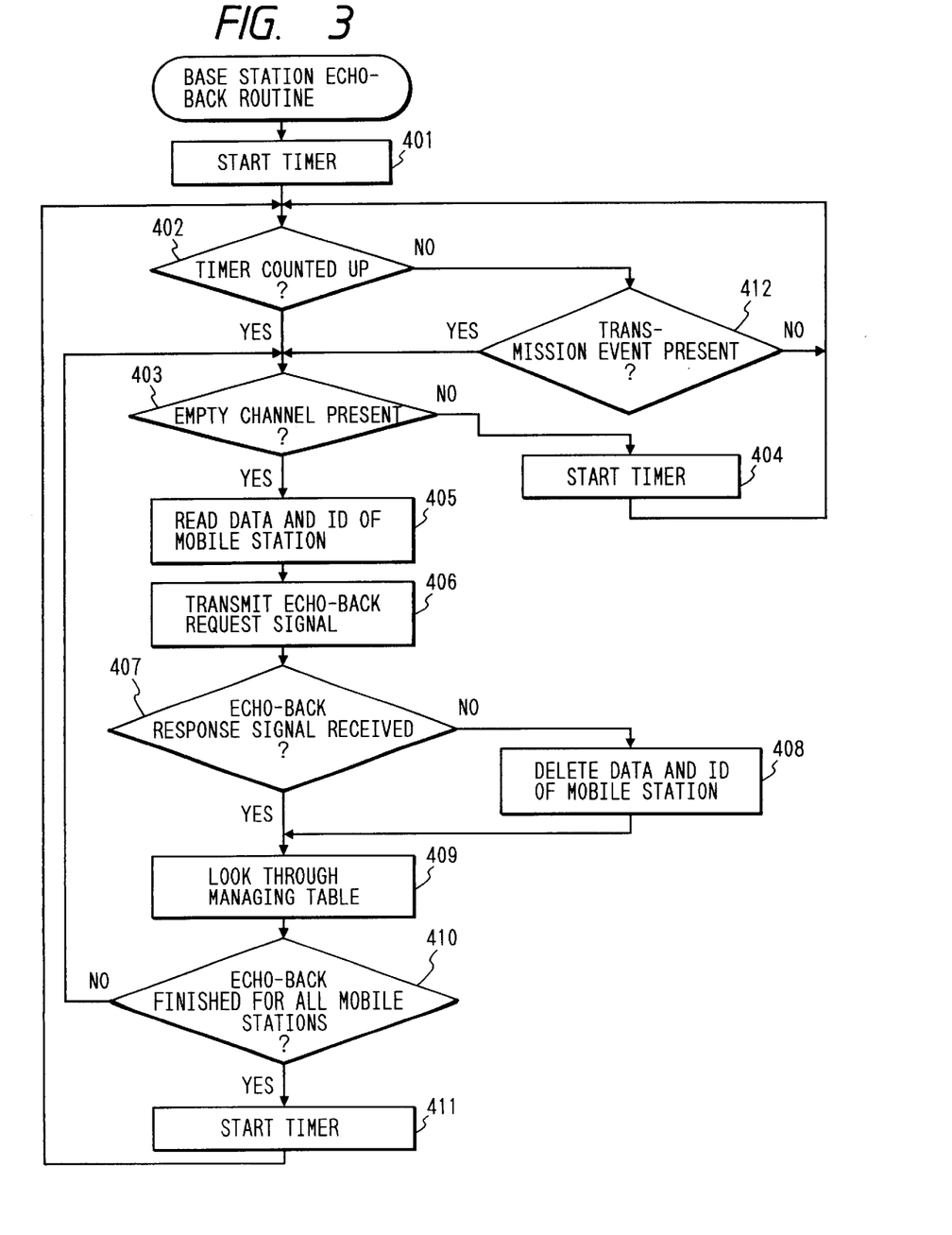
FIG. 3 is a flowchart showing an echo-back routine to be executed in a base station of the radio telephone system according to the first preferred embodiment.

First, the echo-back routine to be executed in the base station 201 will be described with reference to a flowchart shown in FIG. 3.

At first step 401, the base station control section 210 starts the timer 221*c* of the echo-back timer control section 221*b*. Subsequently, step 402 checks whether the timer 221*c* counts up the preset time. If answer at step 402 is negative, the routine proceeds to step 412. On the other hand, if answer at step 402 is positive, the routine proceeds to step 403 which checks whether there is any radio channel, among radio channels of the B-M radio interface 205, which is not used for communication, that is, an empty radio channel. If answer at step 403 is negative, step 404 starts the timer 221*c* again, and the routine returns to step 402. On the other hand, if answer at step 403 is positive, the routine proceeds to step 405 where the base station control section 210 reads out data for one of the mobile stations 202 stored in the managing table 209*a*, via the location registration managing section 209. The base station control section 210 further reads out from the mobile station ID storing section 208 a mobile station ID of the mobile station 202 corresponding to the data read out from the managing table 209*a*. Subsequently, at step 406, the base station echo-back transmit-receive section 221*a* transmits an echo-back request signal via the B-M radio interface 205 to the mobile station 202 having the read-out mobile station ID. Thereafter, at step 407, the base station echo-back transmit-receive section 221*a* checks whether the B-M radio interface 205 has received an echo-back response signal from the mobile station 202. If answer at step 407 is negative, the routine proceeds to step 408 where the base station echo-back transmit-receive section 221*a* determines that the mobile station 202 concerned is not present in the radio zone of the base station 201, and thus causes the location registration managing section 209 to delete the data of the mobile station 202 concerned from the managing table 209*a* and further causes the base station control section 210 to delete the corresponding mobile station ID from the mobile station ID storing section 208. From step 408, the routine proceeds to step 409. On the other hand, if answer at step 407 is positive, that is, the echo-back response signal has been received from the mobile station 202, the routine proceeds to step 409 where the location registration managing section 209 looks through the managing table 209*a*, and to step 410 where the location registration managing section 209 determines whether the echo-back process has been performed for all the mobile stations which are registered in the managing table 209*a*. If answer at step 410 is negative, the routine returns to step 403 until answer at step 410 becomes positive. On the other hand, if answer at step 410 is positive, step 411 starts the timer again, and the routine returns to step 402 to repeat the foregoing processes.

Referring back to step 402, if answer at step 402 is negative, that is, the timer is not counted up, the routine proceeds to step 412 where the base station control section 210 checks whether a transmission event, that is, a call reception request from the wire circuit 3, is present for any of the mobile stations 2 in the radio zone covered by the base station 201. If answer at step 412 is negative, the routine returns to step 402. On the other hand, if answer at step 412 is positive, a process is performed to enable transmission of the transmission event signal along with the echo-back request signal, and then the routine proceeds to step 403 to perform the foregoing echo-back process.

Figure 4:
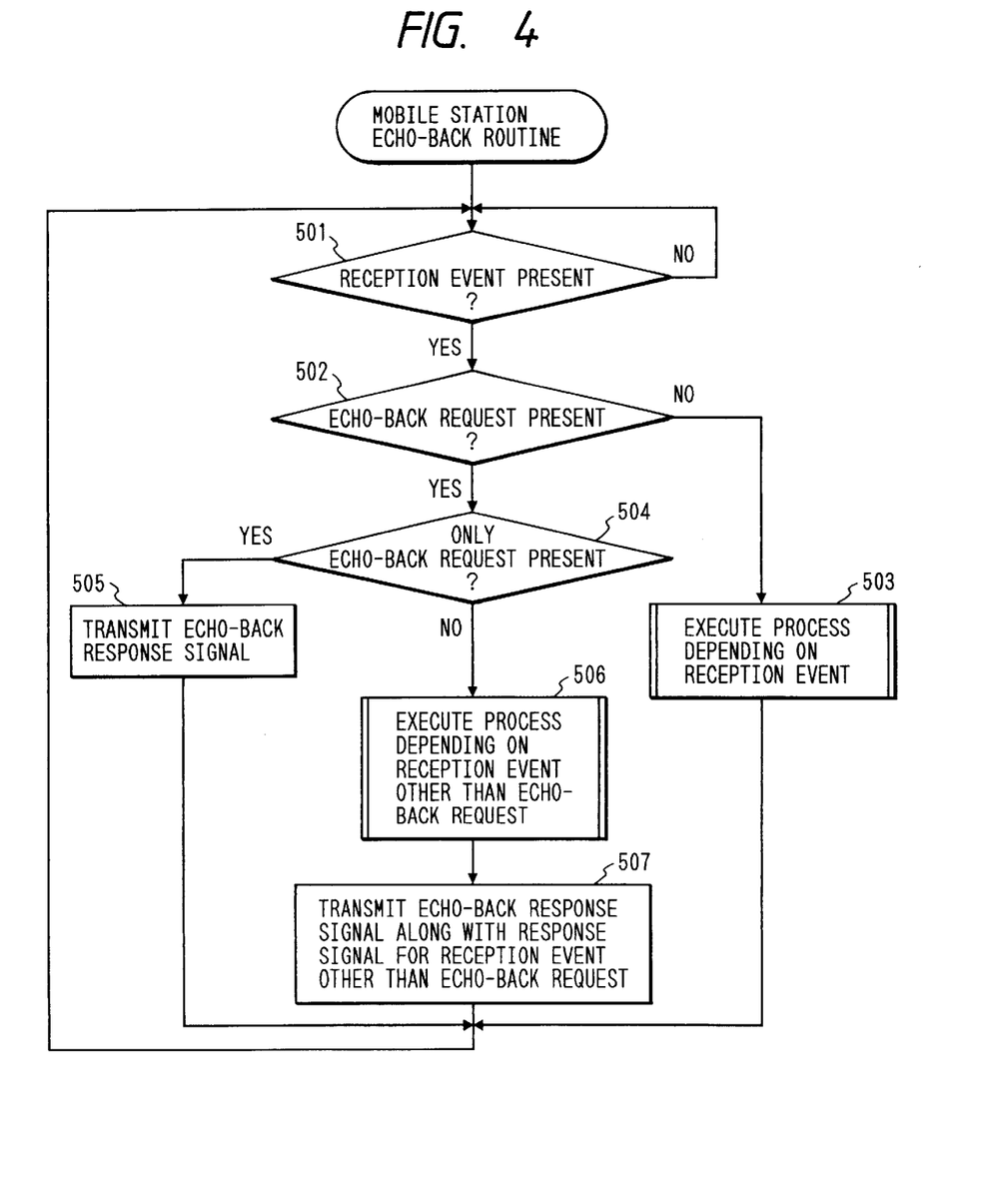
FIG. 4 is a flowchart showing an echo-back routine to be executed in a mobile station of the radio telephone system according to the first preferred embodiment.

Now, the echo-back routine to be executed in the mobile station 202 will be described with reference to a flowchart shown in FIG. 4.

At first step 501, the mobile station control section 220 checks whether a reception event is present, that is, whether a signal received from the base station 201 at the M-B radio interface 211 is present. If answer at step 501 is negative, the routine repeats step 501 until answer at step 501 becomes positive. On the other hand, if answer at step 501 is positive, step 502 checks whether the echo-back request signal is present in the reception event. If answer at step 502 is negative, the routine proceeds to step 503 where a process is performed depending on the reception event in the known manner, and then to step 501. On the other hand, if answer at step 502 is positive, step 504 checks whether the reception event includes only the echo-back request signal. If answer at step 504 is positive, the routine proceeds to step 505 where the mobile station echo-back transmit-receive section 222 transmits the echo-back response signal via the M-B radio interface 211, and then to step 501. On the other hand, if answer at step 504 is negative, the routine proceeds to step 506 where a process is performed depending on the reception event other than the echo-back request signal in the known manner, and then to step 507 where the echo-back response signal is transmitted via the M-B radio interface 211 along with a response signal for the reception event other than the echo-back request signal. Subsequently, the routine returns to step 501.

As described above, according to the first preferred embodiment, the base station 201 executes the echo-back process against the mobile stations 202 at every predetermined time interval or at every occurrence of the transmission event, and deletes the data and the mobile station ID of the non-responsive mobile station 202 from the managing table 209a and the mobile station ID storing section 208, respectively. Accordingly, even when the once-registered mobile station 202 goes away from the radio zone of the base station 201 without contacting the base station 201, since the corresponding data are automatically deleted from the managing table 209a and the mobile station ID storing section 208, the storage capacities of the managing table 209a and the mobile station ID storing section 208 can be effectively used and thus prevented from being increased unnecessarily.

Now, a second preferred embodiment of the present invention will be described hereinbelow with reference to FIG. 5.

Figure 5:
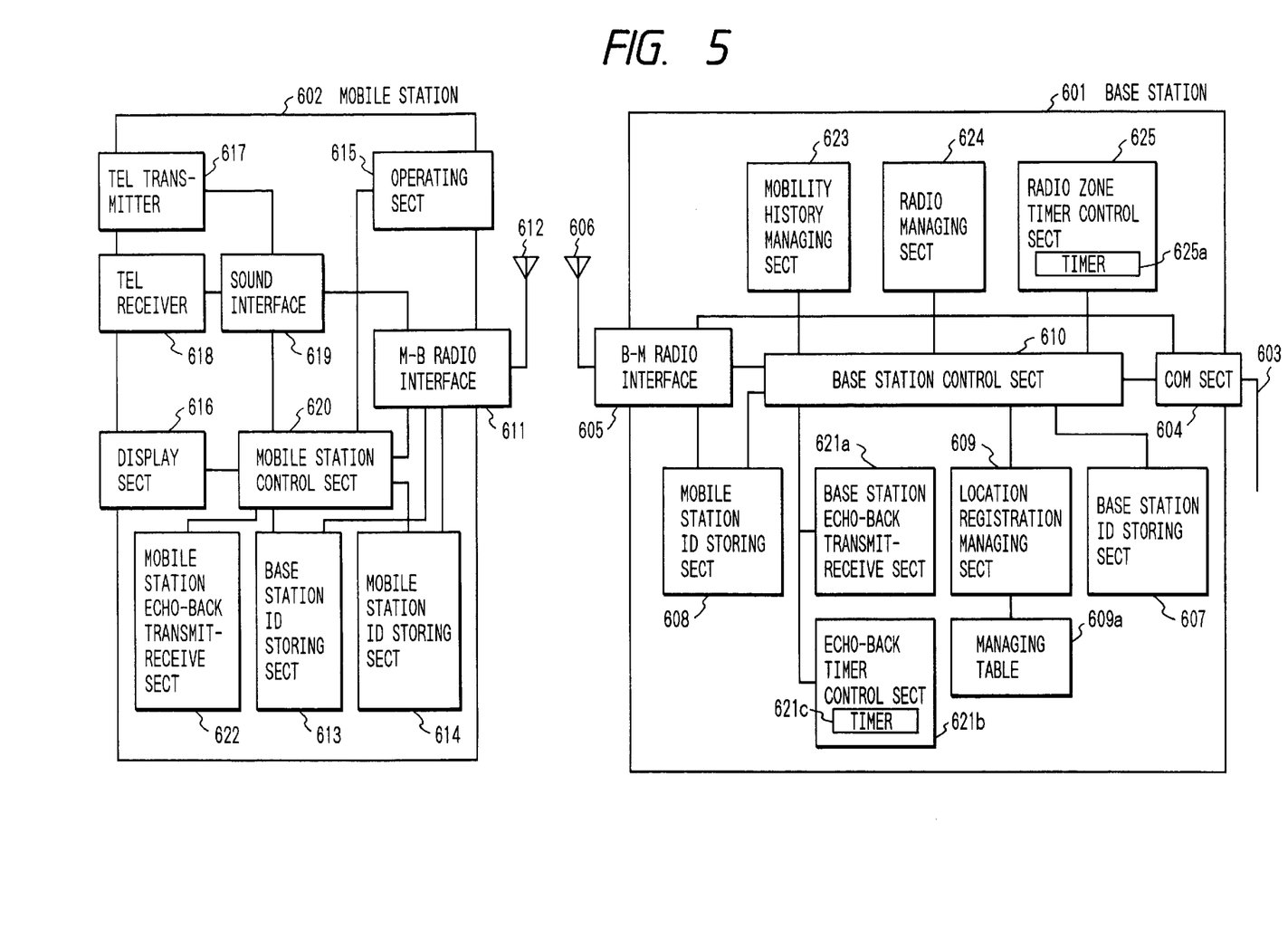
FIG. 5 is a block diagram showing a structure of a radio telephone system according to a second preferred embodiment of the present invention.

FIG. 5 is a block diagram showing a structure of a radio telephone system according to the second preferred embodiment.

Figure 8A:
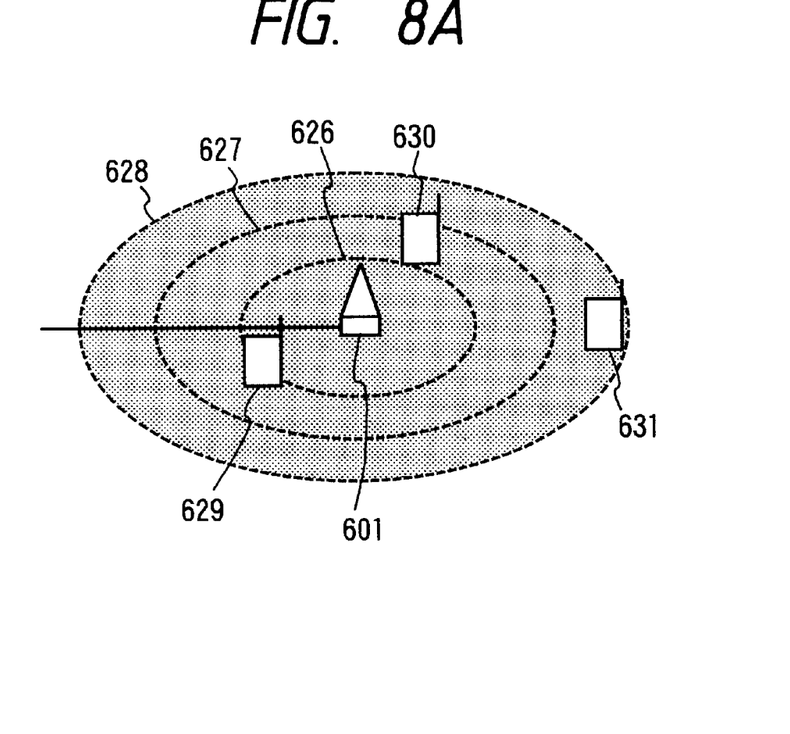
FIG. 8A is a diagram showing a state where a radio zone of the radio telephone system is set maximum according to the second preferred embodiment.

In FIG. 5, numeral 601 denotes a base station, numeral 602 a mobile station, numeral 603 a wire circuit, numeral 604 a communication section, numeral 606 a base station antenna, numeral 607 a base station ID storing section, numeral 608 a mobile station ID storing section, numeral 609 a location registration control section, numeral 609a a managing table, numeral 610 a base station control section, numeral 621a a base station echo-back transmit-receive section, numeral 621b an echo-back timer control section, numeral 612c a timer, numeral 611 an M-B radio interface, numeral 612 a mobile station antenna, numeral 613 a base station ID storing section, numeral 614 a mobile station ID storing section, numeral 615 an operating section, numeral 616 a display section, numeral 617 a telephone transmitter, numeral 618 a telephone receiver, numeral 619 a sound interface, numeral 620 a mobile station control section, and numeral 622 a mobile station echo-back transmit-receive section. Since these elements are the same as those in the first preferred embodiment, explanation thereof will be omitted. On the other hand, the transmission power of a B-M radio interface 605 can be switched between three levels. As shown in FIG. 8A, a boundary of the radio zone of the base station 601 changes between boundaries 626, 627 and 628 depending on the output levels of the B-M radio interface 605.

Numeral 623 denotes a mobility history managing section provided in the base station 601 for managing a past mobility history of the mobile stations 602. Numeral 624 denotes a radio managing section for storing/managing the output levels of the B-M radio interface 605. Numeral 625 denotes a radio zone timer control section for outputting an instruction signal at every predetermined time interval to the base station control section 610 for confirming presence or absence of the mobile stations 602 in the radio zone. The radio zone timer control section 625 includes a timer 625a which is counted up after lapse of a predetermined time from the start-up thereof.

Now, operations of the radio telephone system as structured above will be described hereinbelow.

Since the process of the location registration of the mobile station 602 and the process of the mobile station 602 making and receiving a call are the same as those in the first preferred embodiment, explanation thereof will be omitted.

Figure 6:
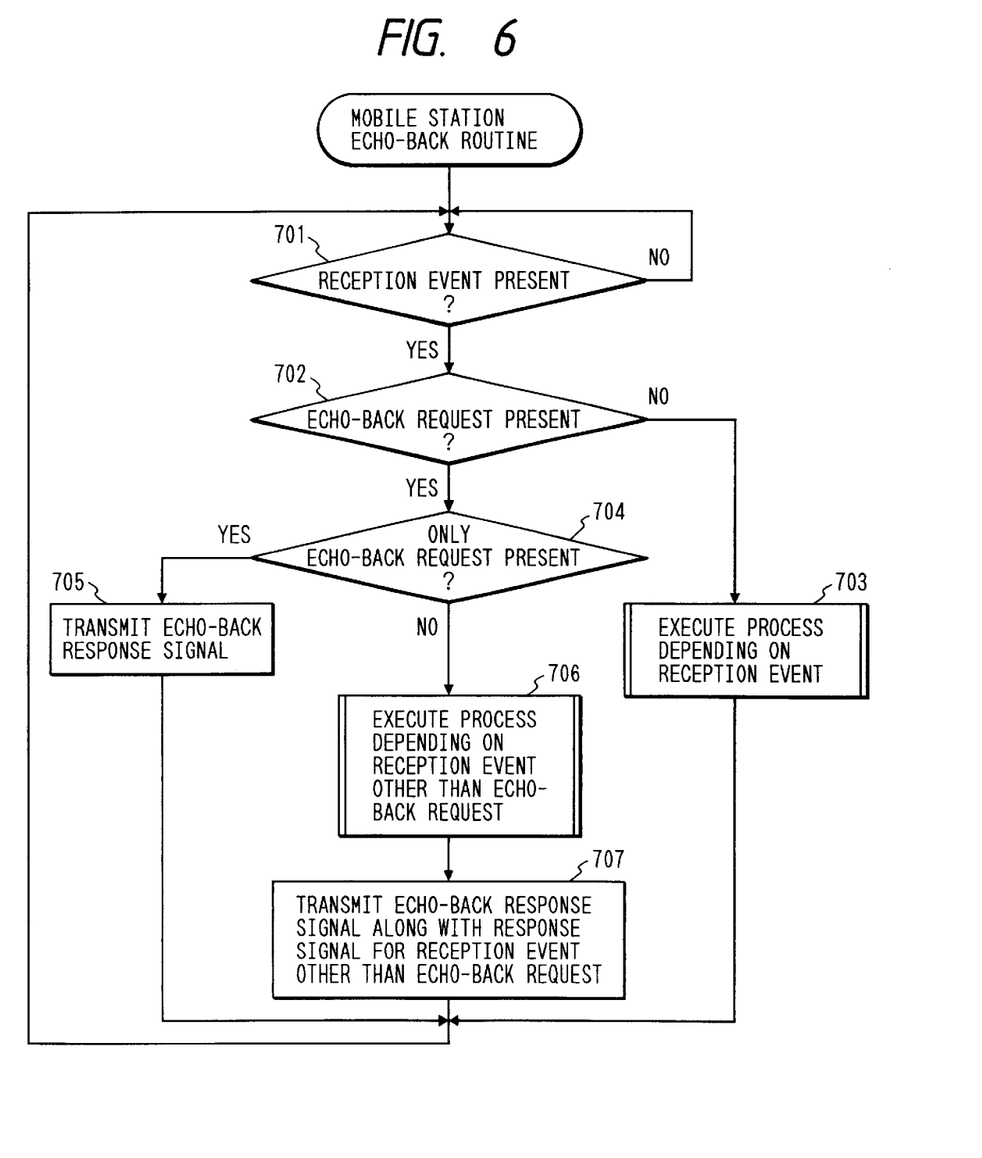
FIG. 6 is a flowchart showing an echo-back routine to be executed in a mobile station of the radio telephone system according to the second preferred embodiment.

First, the echo-back routine to be executed in the mobile station 602 will be described with reference to a flowchart shown in FIG. 6.

At first step 701, the mobile station control section 620 checks whether a reception event is present, that is, whether a signal received from the base station 601 at the M-B radio interface 611 is present. If answer at step 701 is negative, the routine repeats step 701 until answer at step 701 becomes positive. On the other hand, if answer at step 701 is positive, step 702 checks whether the echo-back request signal is present in the reception event. If answer at step 702 is negative, the routine proceeds to step 703 where a process is performed depending on the reception event in the known manner, and then to step 701. On the other hand, if answer at step 702 is positive, step 704 checks whether the reception event includes only the echo-back request signal. If answer at step 704 is positive, the routine proceeds to step 705 where the mobile station echo-back transmit-receive section 622 transmits the echo-back response signal via the M-B radio interface 611, and then to step 701. On the other hand, if answer at step 704 is negative, the routine proceeds to step 706 where a process is performed depending on the reception event other than the echo-back request signal in the known manner, and then to step 707 where the echo-back response signal is transmitted via the M-B radio interface 611 along with a response signal for the reception event other than the echo-back request signal. Subsequently, the routine returns to step 701.

Now, a control of radio transmission power of the base station 601 will be described hereinbelow with reference to FIGS. 7, 8A and 8B.

Figure 7:
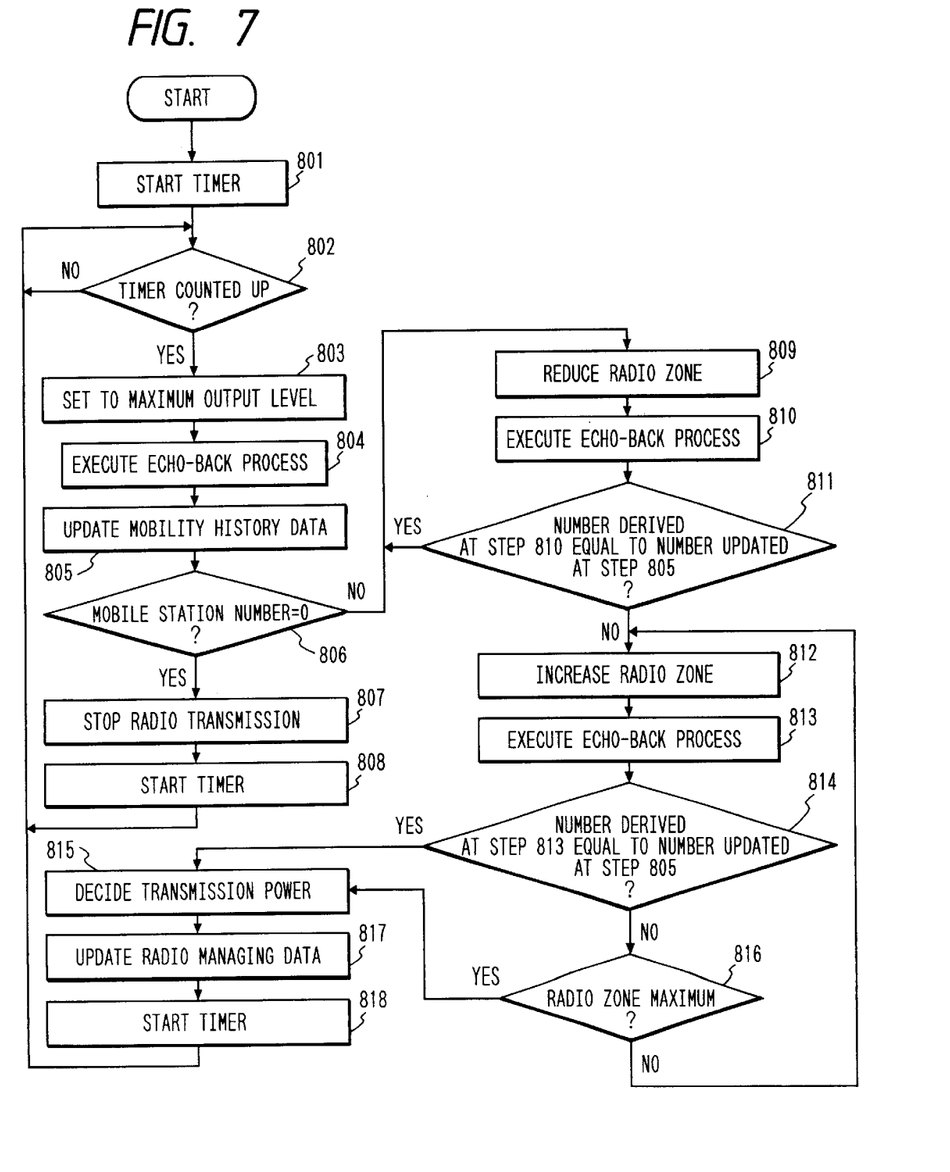
FIG. 7 is a flowchart showing a routine to be executed in a base station of the radio telephone system according to the second preferred embodiment.
Figure 8B:
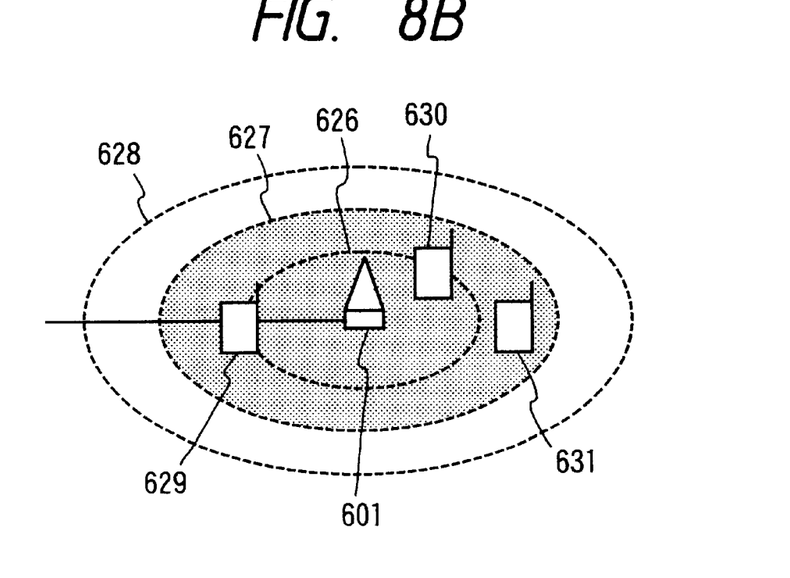
FIG. 8B is a diagram showing a state where the radio zone of the radio telephone system is reduced according to the second preferred embodiment.

FIG. 7 is a flowchart showing operations of the base station 601 in the radio telephone system according to the second preferred embodiment, FIG. 8A is a diagram showing the state where the radio zone of the radio telephone system is set maximum according to the second preferred embodiment, and FIG. 8B is a diagram showing the state where the radio zone of the radio telephone system is reduced according to the second preferred embodiment. In FIGS. 8A and 8B, numerals 626, 627 and 628 represent the radio zone boundaries determined by the radio managing section 624 of the base station 601, and numerals 629, 630 and 631 represent the mobile stations.

At first step 801, the base station control section 610 starts the timer 625a of the radio zone timer control section 625. Subsequently, at step 802, the base station control section 610 checks whether the timer 625a is counted up. If answer at step 802 is negative, the routine repeats step 802 until answer at step 802 becomes positive. On the other hand, if answer at step 802 is positive, the routine proceeds to step 803 where the B-M radio interface 605 is controlled to have the maximum transmission power and the fact that the transmission power of the B-M radio interface 605 has been set to the maximum level is stored in the radio managing section 624. This causes the radio zone of the base station 601 to extend to the boundary 628 as indicated by dotted area in FIG. 8A, that is, to be the maximum. Subsequently, the routine proceeds to step 804 where the base station control section 610 controls the base station echo-back transmit-receive section 621a and the echo-back timer control section 621b so as to execute the echo-back process to all the mobile stations identified by the mobile station ID storing section 608 and the location registration managing section 609. This echo-back process is executed essentially in the same manner as in the first preferred embodiment.

Subsequently, the routine proceeds to step 805 where the number of the mobile stations 602 data of which are stored in the managing table after the echo-back process at step 804, is stored in the mobility history managing section 623.

Thereafter, at step 806, the base station control section 610 checks whether the number of the mobile stations stored in the mobility history managing section 623 is 0 (zero). If answer at step 806 is positive, step 807 stops the transmission from the B-M radio interface 605, and then step 808 starts the timer 625a again. The routine then returns to step 802. On the other hand, if answer at step 806 is negative, the routine proceeds to step 809 where the base station control section 610 controls the B-M radio interface 605 to reduce the transmission power by one level. This causes the radio zone to be reduced to the boundary 627 as shown by dotted area in FIG. 8B. Subsequently, the fact that the transmission power of the B-M radio interface 605 has been reduced by one level is stored in the radio managing section 624. The routine then proceeds to step 810 where the base station control section 610 controls the base station echo-back transmit-receive section 621a and the B-M radio interface 605 so as to execute the echo-back process again. However, in the echo-back process executed at step 810, the deletion of the data and the mobile station ID of the non-responsive mobile station 602 from the managing table 609a and the mobile station ID storing section 608 is not performed, but the number of the responsive mobile stations 602 is only counted. Subsequently, step 811 checks whether the number of the mobile stations counted at step 810 and the number of the mobile stations stored in the mobility history managing section 623 before reducing the radio zone at step 809 are equal to each other. If answer at step 811 is positive, the routine returns to step 809 so as to further reduce the transmission power of the B-M radio interface 605 by one level, and proceeds to step 810 so as to execute the echo-back process. On the other hand, if answer at step 811 is negative, the routine proceeds to step 812 where the transmission power of the B-M radio interface 605 is increased by one level, and then to step 813 where the echo-back process is executed in the same manner as at step 810 so as to derive the number of the responsive mobile stations.

Thereafter, step 814 checks whether the number of the mobile stations stored in the mobility history managing section 623 at step 805 and the number of the mobile stations derived at step 813 are equal to each other. If answer at step 814 is positive, the routine proceeds to step 815 where the transmission power of the B-M radio interface 605 is decided to be the level as set at step 812. On the other hand, if answer at step 814 is negative, step 816 checks whether the transmission power of the B-M radio interface 605 is set maximum. If answer at step 816 is positive, the routine proceeds to step 815 where the transmission power of the B-M radio interface 605 is decided to be the maximum. On the other hand, if answer at step 816 is negative, the routine proceeds to step 812 where the transmission power of the B-M radio interface 605 is increased by one level.

When the transmission power of the B-M radio interface 605 is decided, the base station control section 610 controls the B-M radio interface 605 to perform transmission in the decided power level. Subsequently, at step 817, the decided power level is stored in the radio managing section 624. The routine then proceeds to step 818 which starts the timer 625a again, and then returns to step 802.

As described above, according to the second preferred embodiment of the present invention, the output level of the B-M radio interface 605 is changed depending on the situation where the mobile stations are concentrated around the base station 601 or no mobile station is present in the radio zone of the base station 601. Accordingly, a power consumption of the B-M radio interface 605 can be reduced as compared with the conventional case where the transmission power of the B-M radio interface 605 is always set to the maximum value.

In the second preferred embodiment, the timer values of the echo-back timer control section 621b and the radio zone timer control section 625 may be fixed values, or may be dynamically changed depending on the number of the mobile stations 602 in the radio zone. When, for example, variation in the number of the mobile stations 602 of the mobility history managing section 623 is significant, the more flexible zone control can be achieved by dynamically changing those timer values.

Further, in the second preferred embodiment, the transmission power of the B-M radio interface 605 can be switched between three levels. However, as appreciated, the number of the switchable levels is not limited to three, but may be set to another value.

It is to be understood that this invention is not to be limited to the preferred embodiments and modifications described above, and that various changes and modifications may be made without departing from the spirit and scope of the invention as defined in the appended claims.

What is claimed is:

1. A radio telephone system including a base station connected to a wire circuit and a plurality of mobile stations, located in a radio zone of the base station, which perform radio communications with the base station, respectively, said radio telephone system comprising:

a first interface provided in each of said mobile stations for performing communication with said base station;

a second interface provided in said base station, said second interface adapted to change its transmission power for performing radio communications with said mobile stations, respectively; and a control section provided in said base station for controlling the transmission power of said second interface by determining positions of the mobile stations within said radio zone based on echo-back response signals received from said mobile stations, so that said second interface performs the radio communications with all the mobile stations located in said radio zone at a controlled minimum transmission power that is common to all of the mobile stations located in said radio zone.

2. The radio telephone system as set forth in claim 1, wherein the control of said control section is performed at every predetermined time interval.

3. The radio telephone system as set forth in claim 1, wherein the control of said control section is performed when another transmission is necessary to the mobile station.

4. A base station of a radio telephone system, connected to a wire circuit, said base station comprising:

a first interface for performing radio communications with a plurality of mobile stations located in a radio zone of the base station;

a transmit-receive section for receiving signals from said mobile stations via said first interface; and a control section for controlling an output level of said first interface by determining positions of said mobile stations within said radio zone based on echo-back response signals received from said mobile stations by operation of said transmit-receive section, so that said first interface performs the radio communications with all the mobile stations located in said radio zone at a controlled minimum output level that is common to all of the mobile stations located in said radio zone.

5. The base station as set forth in claim 4, wherein the control of said control section is performed at every predetermined time interval.

6. The base station as set forth in claim 4, wherein the control of said control section is performed when another transmission is necessary to the mobile station.

7. A radio telephone system including a base station connected to a wire circuit and a plurality of mobile stations which perform radio communications with the base station, respectively, said radio telephone system comprising:

a first interface provided in each of said mobile stations for performing communication with said base station;

a second interface provided in said base station, said second interface being variable in its transmission power for performing radio communications with said mobile stations;

a base station echo-back transmit-receive section provided in said base station for transmitting echo-back request signals to said mobile stations located in a radio zone of said base station via said second interface and for receiving echo-back response signals transmitted from said mobile stations via said second interface;

a mobile station echo-back transmit-receive section provided in each of said mobile stations for transmitting one of the echo-back response signals in response to a corresponding one of the echo-back request signals transmitted from said base station so that all the mobile station echo-back transmit-received sections of said mobile stations which received the echo-back request signals from said base station transmit the echo-back response signals to notify said base station of their presence in said radio zone; and a control section for controlling a transmission power of said second interface by determining positions of said mobile stations within said radio zone based on echo-back response signals received from said mobile stations by operation of said base station echo-back transmit-receive section, so that said second interface performs the radio communications with all the mobile stations located in said radio zone at a controlled minimum transmission power that is common to all the mobile stations in said radio zone.

8. The radio telephone system as set forth in claim 7, wherein said echo-back request signal from said base station echo-back transmit-receive section is transmitted after every lapse of a predetermined time.

9. The radio telephone system as set forth in claim 7, wherein said echo-back request signal from said base station echo-back transmit-receive section is transmitted when another transmission is necessary to any one of the mobile stations.

10. The radio telephone system as set forth in claim 7, wherein said base station includes a managing table for storing managing data of said mobile stations, and wherein said base station echo-back transmit-receive section controls transmission of the echo-back request signals relative to the mobile stations the managing data of which are stored in said managing table.

11. A radio telephone system including a base station connected to a wire circuit and a plurality of mobile stations which perform radio communications with the base station, respectively, said radio telephone system comprising:

a first interface provided in each of said mobile stations for performing communication with said base station;

a second interface provided in said base station for performing radio communications with said mobile stations;

a base station echo-back transmit-receive section provided in said base station for transmitting echo-back request signals to said mobile stations via said second interface and for receiving echo-back response signals transmitted from said mobile stations via said second interface;

a mobile station echo-back transmit-receive section provided in each of said mobile stations for transmitting the echo-back response signal in response to the echo-back request signal transmitted from said base station;

a readable/writable storing section;

a first control section for controlling an output level of said second interface to be maximum, for controlling said base station echo-back transmit-receive section to transmit the echo-back request signals to said mobile stations so as to count the number of the echo-back response signals in response to said echo-back request signals, and for writing a counted value in said storing section;

a second control section for controlling an output level of said second interface to a given value and for controlling said base station echo-back transmit-receive section to transmit the echo-back request signals to said mobile stations so as to count the number of the echo-back response signals in response to said echo-back request signals and store a counted value in said second control section;

a comparing section for comparing the counted values stored in said second control section and said storing section, and a third control section for fixing the output level of said second interface to a given value when said counted values are equal to each other based on the comparison of said comparing section.

12. The radio telephone system as set forth in claim 11, wherein said echo-back request signal from said base station echo-back transmit-receive section is transmitted after every lapse of a predetermined time.

13. The radio telephone system a set forth in claim 11, wherein said echo-back request signal from said base station echo-back transmit-receive section is transmitted when another transmission is necessary to any one of the mobile stations.

14. A radio telephone system including a base station connected to a wire circuit and a plurality of mobile stations which perform radio communications with the base station respectively, said radio telephone system comprising:

a first interface provided in each of said mobile stations for performing communication with said base station;

a second interface provided in said base station for performing radio communication with said mobile stations;

a base station echo-back transmit-receive section provided in said base station for transmitting echo-back request signals to said mobile stations via said second interface and for receiving echo-back response signals transmitted from said mobile stations via said second interface;

a mobile station echo-back transmit-receive section provided in each of said mobile stations for transmitting the echo-back response signal in response to the echo-back request signal transmitted from said base station;

a readable/writable storing section, a first control section for controlling an output level of said second interface to be maximum, for controlling said base station echo-back transmit-receive section to transmit the echo-back request signals to said mobile stations so as to count the number of the echo-back response signals in response to said echo-back request signals, and for writing a counted value in said storing section;

a second control section for controlling an output level of said second interface to a given value and for controlling said base station echo-back transmit-receive section to transmit the echo-back request signals to said mobile stations so as to count the number of the echo-back response signals in response to said echo-back request signals and store a counted value in said second control section;

a comparing section for comparing the counted values stored in said second control section and said storing section;

a third control section for fixing the output level of said second interface to a given value when said counted values are equal to each other based on the comparison of said comparing section; and a fourth control section for activating said second control section when said counted values are different from each other based on the comparison of said comparing section.

15. The radio telephone system as set forth in claim 14, wherein said echo-back request signal from said base station echo-back transmit-receive section is transmitted after every lapse of a predetermined time.

16. The radio telephone system a set forth in claim 14, wherein said echo-back request signal from said base station echo-back transmit-receive section is transmitted when another transmission is necessary to any one of the mobile stations.

17. A radio telephone system including a base station connected to a wire circuit and a plurality of mobile stations which perform radio communications with the base station respectively, said radio telephone system comprising:

a first interface provided in each of said mobile stations for performing communication with said base station;

a second interface provided in said base station for performing radio communication with said mobile stations;

a base station echo-back transmit-receive section provided in said base station for transmitting echo-back request signals to said mobile stations via said second interface and for receiving echo-back response signals transmitted from said mobile stations via said second interface;

a mobile station echo-back transmit-receive section provided in each of said mobile stations for transmitting the echo-back response signal in response to the echo-back request signal transmitted from said base station via said first interface;

a first control section for controlling an output level of said second interface to be a maximum level, for controlling said base station echo-back transmit-receive section to transmit the echo-back request signals to said mobile stations, and for counting the number of the echo-back response signals in response to said echo-back request signals to generate a first counted value;

a second control section for reducing the output level of said second interface by a given value, for controlling said base station echo-back transmit-receive section to transmit the echo-back request signals to said mobile stations, and for counting the number of the echo-back response signals in response to said echo-back request signals to generate a second counted value;

a first comparing section for comparing said first and second counted values;

a third control section for increasing the output level of said second interface by a given value, for controlling said base station echo-back transmit-receive section to transmit the echo-back request signals to said mobile stations, and for counting the number of the echo-back response signals in response to said echo-back request signals to generate a third counted value when said first and second counted values are not equal to each other based on the comparison performed by said first comparing section, wherein said third control section activates said second control section when said first and second counted values are equal to each other based on the comparison performed by said first comparing section;

a second comparing section for comparing said first and third counted values;

a fourth control section for deciding the output level of said second interface when the first and third counted values are equal based on the comparison performed by said second comparing section, and for activating said third control section when the first and third counted values are not equal based on the comparison performed by said second comparing section.

18. The radio telephone system of claim 17, wherein the fourth control section includes determining means for determining if the output level of said second interface is at the maximum level prior to the activation of said third control section, and wherein said fourth control section decides the output level of said second interface if the determining means determines the output level is at the maximum level and proceeds with the activation of the third control section if the determining means determines that the output level is not at the maximum level.

* * * * *